(12) United States Patent
Pandey et al.

(10) Patent No.: US 11,095,468 B1
(45) Date of Patent: Aug. 17, 2021

(54) MEETING SUMMARY SERVICE

(71) Applicant: Amazon Technologies, Inc., Seattle, WA (US)

(72) Inventors: Chhaya Pandey, Seattle, WA (US); Divyang Mahendrabhai Upadhyay, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/790,340

(22) Filed: Feb. 13, 2020

(51) Int. Cl.
| | |
|---|---|
| *H04L 29/08* | (2006.01) |
| *H04L 12/18* | (2006.01) |
| *G06F 16/9032* | (2019.01) |
| *G06N 20/00* | (2019.01) |
| *G10L 15/26* | (2006.01) |
| *G10L 17/00* | (2013.01) |

(52) U.S. Cl.
CPC .... *H04L 12/1831* (2013.01); *G06F 16/90324* (2019.01); *G06N 20/00* (2019.01); *G10L 15/26* (2013.01); *G10L 17/00* (2013.01)

(58) Field of Classification Search
CPC .................................................. H04L 12/1831
See application file for complete search history.

(56) References Cited

U.S. PATENT DOCUMENTS

2018/0006837 A1* 1/2018 Cartwright ............ H04M 3/568
2018/0279063 A1* 9/2018 Sun ........................ H04M 3/565

* cited by examiner

*Primary Examiner* — Adnan M Mirza
(74) *Attorney, Agent, or Firm* — Lee & Hayes, P.C.

(57) ABSTRACT

Technologies are disclosed for to utilizing a meeting summary service to generate meeting notes. The meeting notes generated by the meeting summary service can include a variety of information such as participant information, meeting information (e.g., time, place, location, . . . ) meeting agenda information, identified action items, a transcript of the meeting, a recording of the meeting, meeting content presented and/or distributed during the meeting, and the like. The meeting summary service generates meeting notes utilizing a transcript created from a recording of the meeting. In some configurations, machine learning mechanisms may be utilized to identify action items and generating summary information for the meeting. Action items may be assigned to users and tracked to determine state of the action items (e.g., completed). The meeting summary service may also provide a user interface that allows a user, such as a meeting participant, to review the meeting notes.

20 Claims, 11 Drawing Sheets

MEETING SUMMARY SERVICE

BACKGROUND

Today, users may utilize a variety of different tools to organize and facilitate meetings. For example, a meeting organizer may use software to schedule a meeting. The meeting might include participants that attend in a conference room as well as remote participants that attend via video and/or audio. In other examples, a user may use presentation software to assist in presenting information during a meeting. For instance, a user might present slides, video, audio, or other content, during a meeting.

Even though different tools exist to assist users in scheduling and facilitating meetings, meeting organizers often have to choose between taking detailed notes and being fully engaged in a meeting. Even with the best of intentions, capturing key decisions and/or events during a meeting often gets neglected. Without meeting notes that detail key decisions and events, however, it may be difficult for meeting organizers, or other participants or users, to determine what was accomplished during the meeting. The few meeting notes that may be captured and compiled may be shared in a variety of different ways such as through a messaging application, a shared document, and the like. Accessing and searching these notes, however, can be difficult. For instance, a user may forget where the notes are located and/or how the notes were shared.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
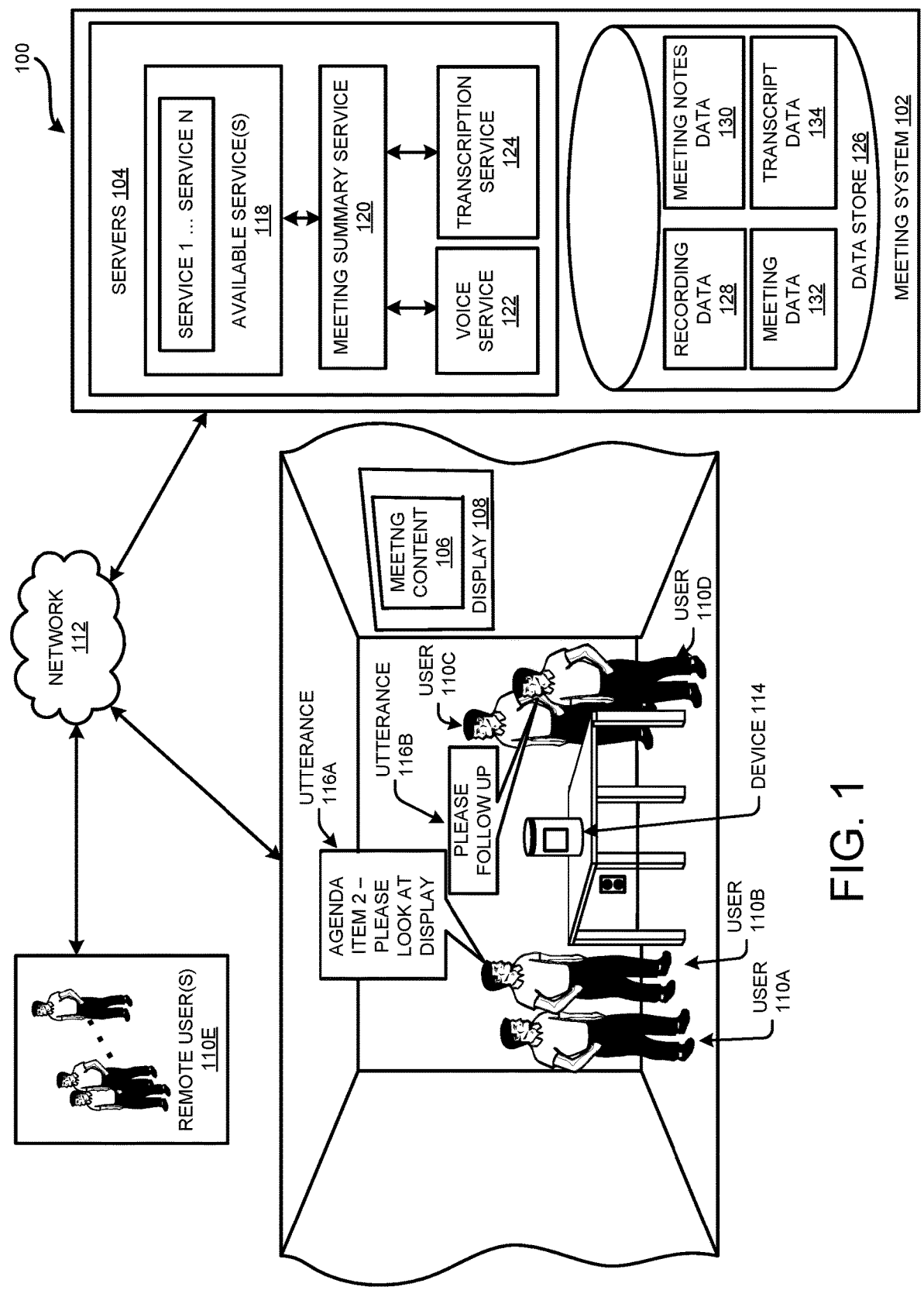
FIG. 1 is a software and network architecture diagram showing aspects of the configuration and utilization of a meeting system that utilizes a meeting summary service to generate meeting notes.

The following detailed description is directed to technologies for utilizing a meeting summary service to generate meeting notes. Generally, a "meeting summary service" as used herein refers to software and/or hardware that receives input from a user and completes tasks or performs other operations related to automatically generating meeting notes. Utilizing techniques described herein, one or more services and/or applications provided by a service provider network may be utilized to generate, share, and search meeting notes. The meeting may be a meeting in which users or "participants" attend in person, attend remotely via video and/or audio, or some combination of in person attendance and remote attendance. A "meeting note" or a "meeting record" as used herein captures information discussed during the meeting, such as key points, events, and/or follow-up items/tasks (which may collectively be referred to herein as "action items"). The meeting notes generated by the meeting summary service can include a variety of information such as participant information (e.g., who attended the meeting, where the participants were located, . . . ), meeting information (e.g., time, place, location, . . . ) meeting agenda information (e.g., topics of the meeting), identified action items, a transcript of the meeting, a recording of the meeting, meeting content presented and/or distributed during the meeting, and the like.

In some configurations, a meeting summary service generates meeting notes utilizing a transcript created from a recording of the meeting. The transcript may be utilized to identify portions of the meeting in which action items were discussed. As discussed in more detail below, the transcript may be parsed to identify key words that indicate an action item, and/or the transcript may be utilized by one or machine learning mechanisms to generate the meeting notes. By utilizing the meeting summary service to record the meeting and generate meeting notes, meeting organizers and participants can remain fully engaged in meetings without having to worry about taking notes during the meeting. After the meeting notes are generated by the meeting summary service (as described in more detail below), a user, such as the meeting organizer, may review and edit the meeting notes before the notes are shared with the meeting participants and/or other users.

The users with whom the meeting notes have been shared may utilize a user interface, and/or a meeting summary service, to search, identify, recall, and replay parts of the meeting. For example, a user may view the meeting notes within a graphical user interface (GUI). In some configurations, the GUI shows information associated with the meeting record generated for the meeting. For instance, the GUI may show a summary of the meeting and/or a summary of various sections of the meeting, action items identified from the meeting, all/part of a transcript of the meeting, and all/part of a recording of the meeting. According to some examples, a user may highlight an action item presented within a UI and view the underlying raw transcript, listen to the audio recording, and/or view a video recording that is associated with the point of the meeting when the highlighted action item was discussed in the meeting.

In other examples, a user may utilize a virtual assistant, to interact with the meeting notes generated by the meeting summary service. Generally, a "virtual assistant" as used herein refers to software and/or hardware that receives input from a user and completes tasks or performs other operations for the user. As described herein, the virtual assistant is configured to understand natural language voice commands and complete tasks for the user, such as interacting with the meeting summary service. For instance, a user may search the meeting notes using voice, and/or cause a portion of the meeting notes to be presented to the user (e.g., via a speaker and/or display). As another example, the user may ask the meeting summary service: "Summarizer, what were the highlights of the meeting?" or "Summarizer, what are my action items from the meeting?" In response, the meeting summary service may provide the requested information.

According to some configurations, the meeting summary service causes the meeting to be recorded (e.g., audio and/or video), or obtains a recording of the meeting from a different source (e.g., from a meeting platform), generates a transcript of the meeting from the recording, and then generates the meeting notes by extracting highlights and actionable insights from the transcript of the meetings. In some examples, the meeting summary service, and/or another device or service, listens for speech from users in an environment where the meeting is occurring and/or may listen for speech that is received from a remote connection (e.g., over a phone, a computer, . . . ).

In some examples, the meeting organizer, and other authorized users, may specify key words and/or key phrases (which may be referred to herein as "action words") that may be utilized by the meeting summary service to identify action items discussed during the meeting. For instance, a user may specify that the action words are key words and/or key phrases that are used within an organization to identify topics of interest. In some configurations, the transcript of the meeting is parsed by the meeting summary service to identify the predefined list of action words. Some of these action phrases may include items such as, but not limited to "I will share", "I will ask", "take it offline", "follow up", "agenda item", and the like. The meeting summary service may tag the identified action words and include one or more utterances surrounding such key words/phrases as action items.

According to some examples, machine learning mechanisms may be utilized to identify, or assist in identifying, the action items, generating summary information for the meeting and/or different portions of the meeting, and the like. The term "machine learning" may refer to one or more programs that learns from the data it receives. For example, a machine learning mechanism may build, modify or otherwise utilize a model that is created from example inputs and makes classifications, predictions or decisions using the model. The model may be trained using supervised and/or unsupervised learning. For instance, over time as the meeting summary service receives more data, the data provided by the meeting summary service may change based on actual usage data associated with users of the service that is received. As such, the machine learning mechanism utilized by the service is refined in response to receiving additional data.

For the purposes of this discussion, any type of machine learning model/technique and/or predictive model may be used to determine, calculate, generate, predict, etc., the data (e.g., the meeting notes) described herein. Examples of predictive models that may be utilized include group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, examples of machine learning techniques may include supervised learning, unsupervised learning, semi-supervised learning, classification analysis, regression analysis, clustering, etc. Moreover, any other types of algorithms may also be used.

In some configurations, the meeting summary service may use speech recognition techniques (e.g., automatic speech recognition (ASR)), natural language processing (NLP), and/or natural language understanding (NLU) techniques to identify content that was discussed during the meeting. According to some configurations, the speech recognition, NLP, and/or NLU techniques may identify that the participants are discussing content associated with an agenda item associated with the meeting, and/or content that is associated with another topic not related to an agenda item.

According to some examples, the meeting summarizer may join the meeting at the scheduled time, via audio, video, or both. In other examples, a participant may request the meeting summarizer to join a meeting. For instance, the participant may send an invite to the meeting summarizer, or say to a meeting summary service "Summarizer, join the meeting". Once joined, the meeting summary service may cause a recording of the meeting to be generated. The meeting summary service may also utilize cameras and/or other sensors to obtain additional information during the meeting. For instance, the meeting summary service may obtain video footage of participants speaking during the meeting. This video footage may then be used to identify who was speaking during portions of the meeting, to identify the intended recipient of the speaker, and to associate content within the transcript with the correct speaker and/or recipient. According to some configurations, the meeting summary service may determine how active a participant was during the meeting by determining how much the participant spoke, or was spoken to, during the meeting.

In some examples, the meeting summary service indexes data associated with the meeting within a search index that is searchable at team level or a wider organization level according to user preferences. In this way, a user may locate the relevant content more quickly. Similarly, a user may access the meeting record to interact with the meeting notes generated by the meeting summary service, view/interact with the presentation material, and the like.

According to some configurations, the meeting summary service may be authorized by the user via an "opt-in" authorization procedure to utilize user data such as but not limited to obtaining recordings generated from a user and/or access other data associated with the user. For instance, the meeting summary service may identify one or more calendars, messaging applications, task lists, and the like that are associated with users who have "opted-in".

In some examples, the meeting summary service may access other services/programs to obtain data that may be used to generate the meeting notes. For example, the meeting summary service might access a video service, a search service, a calendar service, a messaging service, a task service, and/or other services. Additional details regarding the various components and processes described briefly above for utilizing a meeting summarizer to generate meeting notes will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization a meeting system 102 that utilizes a meeting summary service 120 to generate meeting notes. It is to be appreciated that the environment 100 is merely illustrative and that the various configurations disclosed herein can be utilized in many different types of computing environments.

To provide the meeting summary service 120 and the other functionality disclosed herein, the meeting system 102 may include one or more servers 104. The servers 104 can execute software components to provide the services described herein, including meeting summary service 120 functionality using different services and/or applications provided by a service provider and/or some other entity. The software components can execute on a single server 104 or in parallel across multiple servers in the meeting system 102. In addition, a software component can consist of subcomponents executing on different servers 104 or other computing devices in the meeting system 102. Various components can be implemented as software, hardware, or any combination of the two. In this regard, it is to be appreciated that the meeting system 102 shown in FIG. 1 has been simplified for discussion purposes and that many additional software and hardware components can be utilized.

A user 110 of the meeting system 102 can utilize a user interface, or some other input device, to access the meeting system 102 through a network 112. According to some configurations, the meeting summary service 120 is configured to understand natural language voice commands and complete tasks for the user, such as tasks related to generating meeting notes as described herein. As illustrated, one or more users 110, such as user 110A, user 110B, user 110C, user 110D, and remote user(s) 110E may be participants of a meeting that utilize a meeting summary service 120 to generate meeting notes. As can be seen, the users 110A, 110B, 110C, and 110D are users within the same room, and users 110E are at one or more remote locations.

In some examples, the meeting summary service 110 utilizes a meeting device 114 to obtain a recording of the meeting. The meeting device 114 may be an input/output device configured to record audio and/or video, receive voice queries/commands/utterances (which may collectively be referred to herein as "voice commands") from a user and provide data to one or more of the services and/or other applications. The meeting device 114 may include one or more microphones for capturing audio data (e.g., voice utterances or commands of users) and one or more cameras for capturing video data within an environment 100 and generating audio signals that represent or are otherwise associated with sound (e.g., the audio data) and generating video signals that represent or are otherwise associated with video (e.g., the video data) from the environment 100. The meeting device 114 may also include one or presentation devices (e.g., a video screen, speakers) that may be utilized to present sound and/or video to participants of a meeting. In some configurations, the meeting device 114 may be utilized by a meeting platform.

The meeting device 114 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, a telephone, a telephone conferencing device, video conferencing device, or any other type of computing device capable of connecting to the network 112 and communicating with the meeting system 102. In other configurations, the meeting device 114 may be configured to communicate with one or more other devices to receive voice commands from users and/or perform processing related to functionality of the meeting system 102.

In some configurations, the meeting device 114 may be configured to perform speech recognition, such as automatic speech recognition (ASR), on the audio signals to identify words or phrases associated with the voice commands therein or may be configured to provide the audio signals to another device (e.g., a remote service such as meeting system 102) for performing the ASR on the audio signals for identifying the voice commands. In other examples, ASR may be performed by a different computing system and/or service, such as voice service 122.

As used herein, performing ASR on an audio signal to identify a voice command may include translating speech represented in the audio signal into text and analyzing the text to identify the voice command. Analysis of the text may be performed, locally by the meeting device 114 and/or remotely by the one or more servers 104 (or other remote services), using natural language processing (NLP) and/or natural language understanding (NLU) techniques in order to determine an intent associated with the voice command.

The meeting device 114, or some other device or service, may also be configured to perform video recognition. For example, the meeting device 114 may utilize video recognition techniques and/or functionality provided by a video recognition service to identify participants of the meeting, who is speaking during the meeting, information presented during the meeting, and the like. For example, the video recognition service may perform facial analysis identify the participants and speakers of the meeting.

As illustrated in FIG. 1, the meeting device 114 may be configured to record audio and/or video of a meeting in the environment 100. For instance, the meeting device 114 may record the conversation and/or video to capture meeting. As illustrated, the meeting device 114 records the utterances, such as utterance 116A (e.g., "Agenda Item 2—Please Look at Display") and utterance 116B (e.g., "Please Follow Up") of user 110D. Many utterances may be recorded during a meeting. The meeting device 114 may interact with one or more remote services, discussed below, to receive and provide and utilize data related to meetings.

As illustrated, the meeting device 114, or some other device or component, may communicate with a meeting system 102 over a network 112. The network 112 may represent an array or wired networks, wireless networks (e.g., Wi-Fi), or combinations thereof. The meeting system 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the meeting system 102, include "on-demand computing", "software as a service (SaaS)", "platform computing", "network accessible platform", and so forth.

As illustrated, the meeting system 102 may comprise one or more network-accessible resources, such as servers 104. These resources comprise one or more processors and computer-readable storage media executable on the processors. In some configurations, the users 110 may be identified and/or authenticated before interacting with the meeting device 114 that is associated with and/or utilized by the meeting system 102. The meeting device 114 may upload an audio signal representing sound captured in the environment 100 and/or a video signal 114 representing video captured in the environment 100 to the meeting system 102 over the network 112.

The network 112 can be a local-area network ("LAN"), a wide-area network ("WAN"), the Internet, or any other networking topology known in the art that connects the user devices to the meeting system 102. The user 110 can use an application (not shown) executing on meeting device 114 to access and utilize the meeting summary service 120 functionality provided by the servers 104. In some examples, the application is a web browser application (not shown). Generally, a web browser application exchanges data with the servers 104 in the meeting system 102 using the hypertext transfer protocol ("HTTP") over the network 112. The application might also be a stand-alone client application configured for communicating with the servers 104.

The client application can also utilize any number of communication methods known in the art to communicate with the meeting system 102 and/or the servers 104 across the network 112, including remote procedure calls, SOAP-based web services, remote file access, proprietary client-server architectures, and the like. According to some configurations, the application may provide a user interface that can be utilized by the user 110 to configure settings associated with the meeting summary service and/or the meeting device 114. Typically, a user 110 interacts with the meeting device 114 using a GUI (not shown) and/or speech that is captured by one or more microphones of the meeting device 114.

In some configurations, a voice service 122, or some other component may process a corresponding audio signal associated with the audio data/voice command to determine words within an utterance (using automatic speech recognition techniques—ASR) and to determine an intent of the user (natural language processing techniques—NLU). Based on the identified words/intent, the voice service 122 can determine whether the utterance is related to the meeting summary service 120 and/or some other service or functionality. In some examples, the meeting summary service 120 provides recording data 128 to the voice service 122 and/or the transcription service 124 to generate a transcript of the meeting. In addition to generating text that represents the words spoken during the meeting, the voice service 122 may determine a subject that is being discussed within the meeting (e.g., using deep machine learning).

As briefly discussed above, the meeting device 114 may act as an input device for the meeting summary service 120 for users, such as users 110. A user, such as users 110, may interact with the meeting device 114 to access functionality of the meeting system 102 using voice commands. Generally, any voice command that relates to functionality associated with the meeting summary service 120 may be uttered by a user 110 to access functionality of the meeting summary service 120. A voice command may be uttered by a user 110, captured by one or more microphones of the meeting device 114, and stored by the meeting device 114 and/or one or more remote devices/services. In other embodiments, the user 110 may input the voice command 116 via one or more input mechanisms (e.g., a keyboard, a display, etc.) or via a gesture that is captured by one or more cameras (e.g., video cameras).

Upon receipt of the voice-command, the meeting device 114, and/or the voice service 122, and/or some other component or service (local or remote from the meeting device 114), may attempt to identify the speaker. According to some configurations, the voice service 122 compares the voice command 116 to voice profiles already created. The voice profiles may be stored in a data store, such as data store 126, associated with the meeting system 102 and/or on the meeting device 114, or some other location.

Generally, if the voice service 122 determines a match between a voice signature determined from the voice command 116 and a stored profile, an identity of the user 110 is determined. A match may be based on one or more audio attributes. In some examples, the voice service 122 may identify the speakers in real time (e.g., during the meeting), and/or at a later point in time (e.g., after the meeting) using recording data 128. To identify the speaker, the voice service 122 may compare audio attributes such as, but not limited to volume, pitch, tone, and the like with stored profiles. In some configurations, information generated by the meeting summary service 120, or some other component or device that is located remotely from the meeting device 114, may be stored locally such that if the meeting summary service 120 is not accessible for some period of time, the meeting device 114 may access the information that may be processed locally by the meeting device 114 or some other computing device.

In addition to providing auditory information, the meeting device 114 and/or some other device in the environment 100, may provide other types of information, such as visual information. For instance, the meeting device 114 might display meeting content 106 on a computing device, such as display 110, that is within the environment 100.

As discussed above, a meeting summary service 120 utilizes one or more services provided by a service provider network to generate meeting notes for a meeting between users, such as users 110A-110E. The meeting summary service 120 may record the meeting, generate meeting notes from the meeting, and allow users to interact with the meeting notes. In some examples, the meeting summary service 120 may be invited to a meeting and may join the meeting at the scheduled time (e.g., as indicated by a calendar invitation). In other examples, a user 110 may request the meeting summary service to join a meeting. For instance, one of the users 110A, 110B, 110C, or 110D may say to a meeting summary service 120 "Summarizer, join the meeting" or "Summarizer, record the meeting". Once joined, the meeting summary service 120 can record the meeting, when authorized by the participants, and store the recording data 128 within data store 126.

In some configurations, the meeting summary service 120 generates meeting notes data 130 utilizing transcript data 134 created from recording data 128 generated from the meeting. The transcript data 134 may be parsed by the meeting summary service 120 to identify key words that indicate an action item, and/or utilized by one or machine learning mechanisms to generate the meeting notes. After the meeting notes are generated by the meeting summary service, a user, such as the meeting organizer, may review and edit the meeting notes before the notes are shared with other meeting participants and/or other users.

Figure 3A:
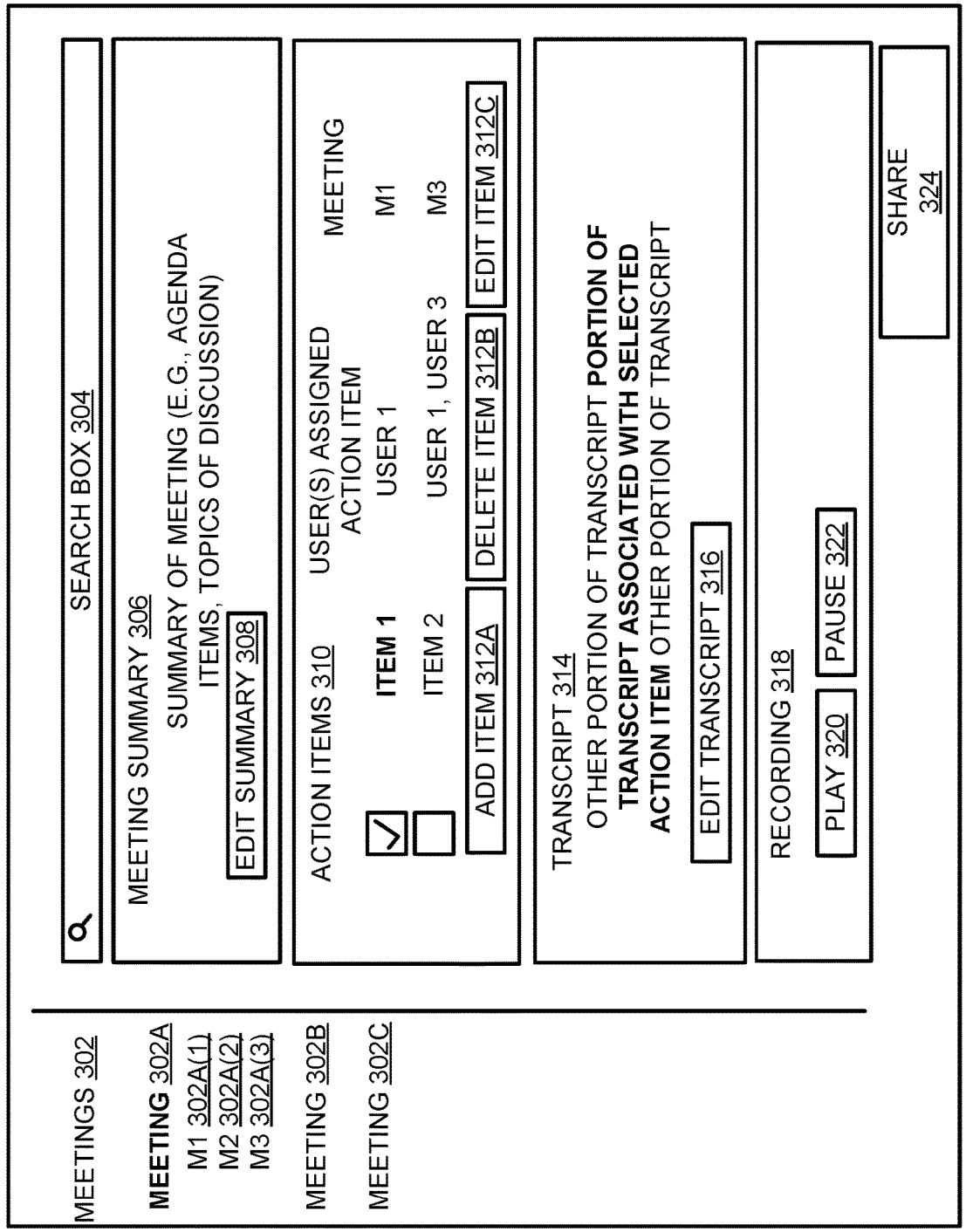
FIG. 3A is a block diagram showing an illustrative graphical user interface that may be utilized to view and search meeting notes.
Figure 3B:
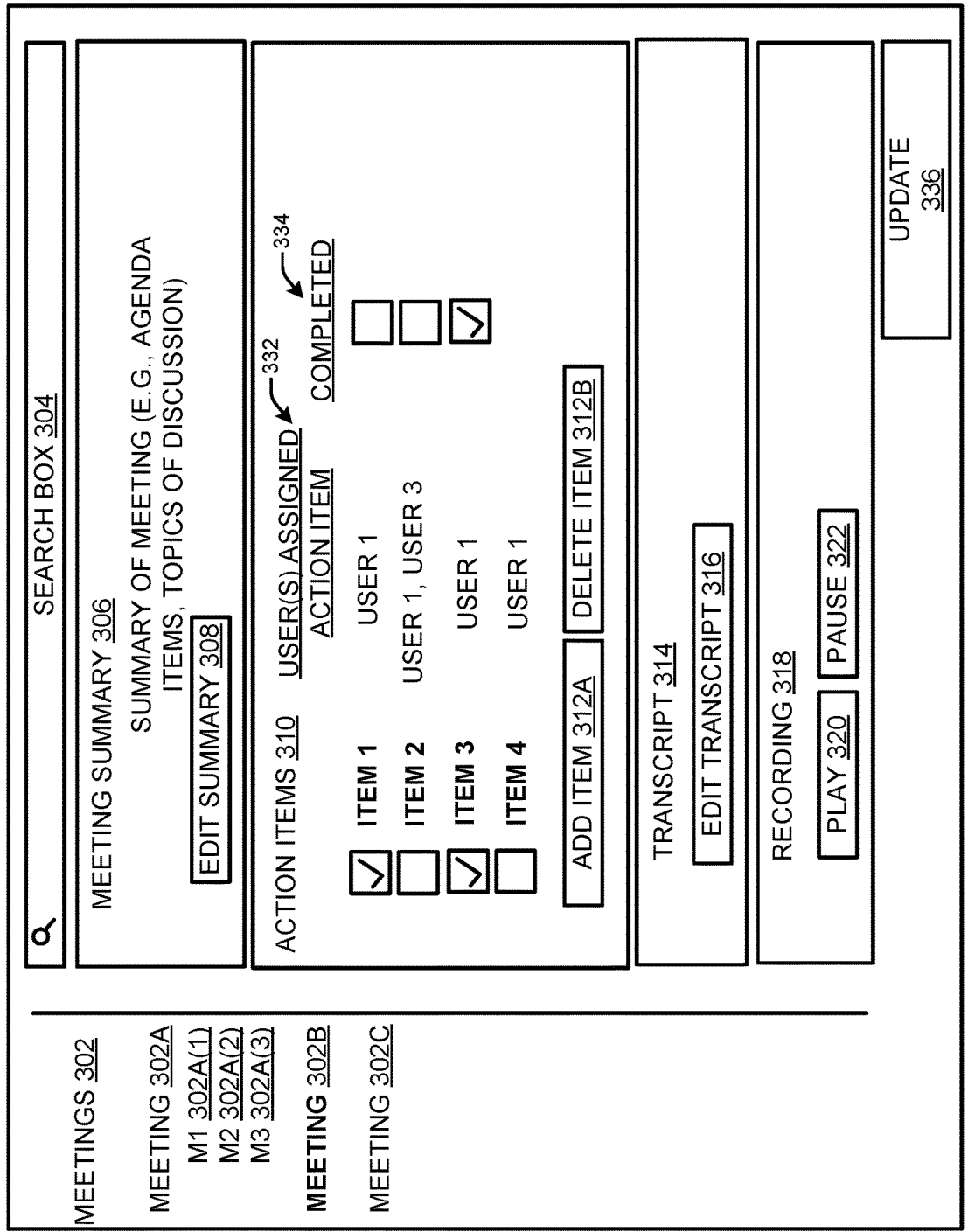
FIG. 3B is a block diagram showing an illustrative graphical user interface that may be utilized to view and search action items associated with a particular user.
Figure 3C:
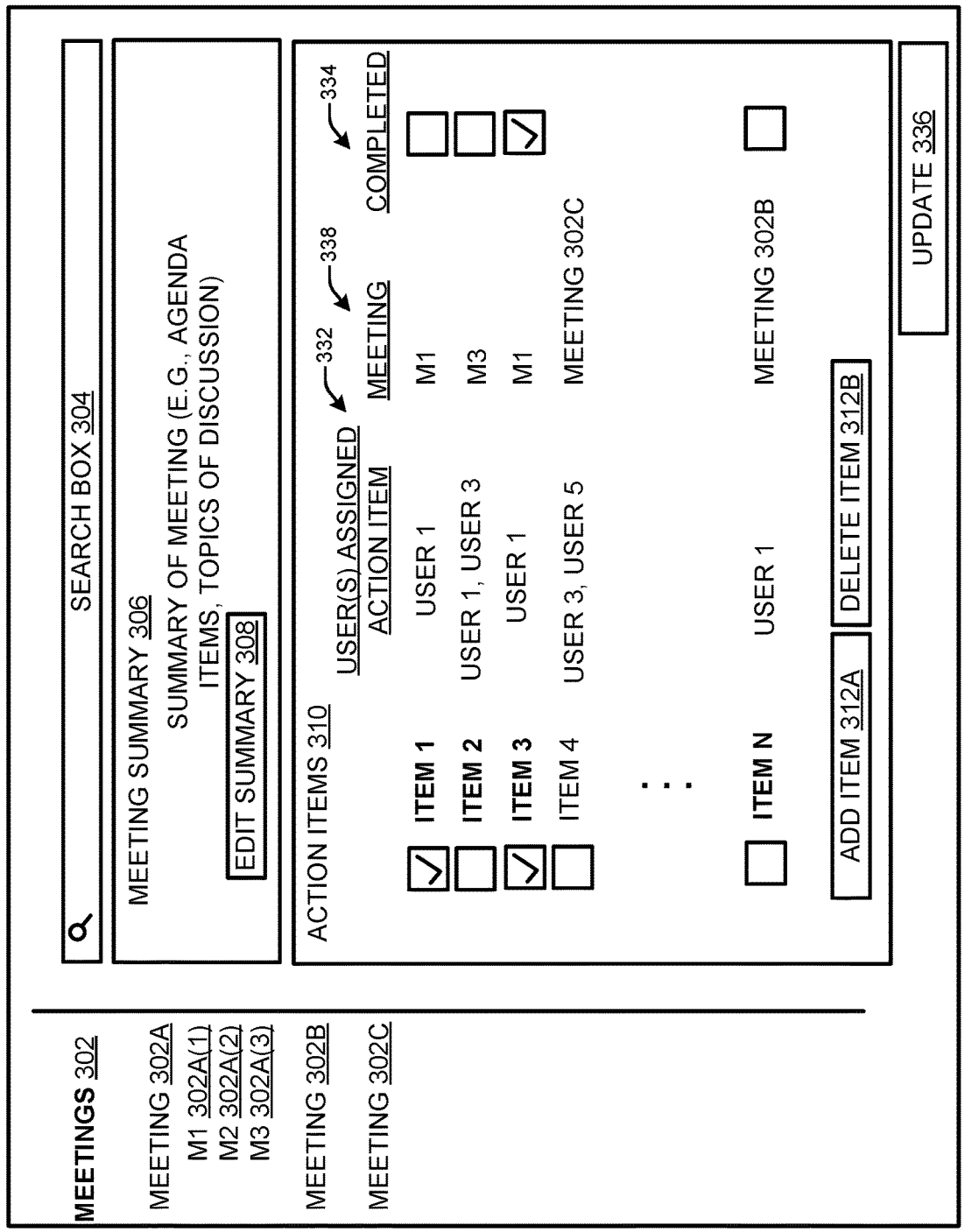
FIG. 3C is a block diagram showing an illustrative graphical user interface that may be utilized to view and search action items associated with meeting notes.

The users with whom the meeting notes have been shared may utilize a user interface, such as the GUI 300 illustrated in FIG. 3A, the GUI 330 illustrated in FIG. 3B, and the GUI 360 illustrated in FIG. 3C, to interact with meeting notes. For example, a user may view the meeting notes within a graphical user interface (GUI). In some configurations, the GUI shows information associated with the meeting record generated for the meeting. For instance, the GUI may show a summary of the meeting and/or a summary of various sections of the meeting, action items identified from the meeting, whether or not an action item/task has been completed, all/part of a transcript of the meeting, and all/part of a recording of the meeting.

In other examples, a user may utilize a virtual assistant, to interact with the meeting notes generated by the meeting summary service. Generally, a "virtual assistant" as used herein refers to software and/or hardware that receives input from a user and completes tasks or performs other operations for the user. As described herein, the virtual assistant is configured to understand natural language voice commands and complete tasks for the user, such as acting as interacting with the meeting summary service. For instance, a user may search the meeting notes using voice, and/or cause a portion of the meeting notes to be presented to the user (e.g., via a speaker and/or display). As another example, the user may ask the meeting summary service: "Summarizer, what were the highlights of the meeting?" or "Summarizer, what are my action items from the meeting?". In response, the meeting summary service may provide the requested information.

According to some examples, the virtual assistant, meeting device 114, or some other component or device is configured to recognize voice commands such as, but not limited to "start transcription", "take notes", "transcribe my next meeting", "stop transcription", "end transcription", "stop taking notes", "cancel transcription", "pause transcription", "go off the record", "resume transcription", "continue transcription", "go on the record", "are you transcribing", "did you transcribe that", "read transcription summary", "play the notes from my meeting", "what were the highlights from my meeting", "show transcription summary", "show the notes from my meeting", "show the action items from my meeting", "start the meeting with transcription", and the like.

According to some configurations, the meeting summary service 120 causes the meeting to be recorded (e.g., audio and/or video) via the media device 114 or obtains a recording of the meeting from a different source (e.g., from a meeting platform as discussed above). The meeting summary service may utilize the transcription service 124 to generate a machine transcription of the meeting from the recording data 128. The meeting summary service 120 may then generate the meeting notes by extracting highlights and actionable insights from the transcript data 134 of the meeting.

As briefly discussed above, the meeting organizer, and other authorized users, may specify action words that may be utilized by the meeting summary service 120 to identify action items. For instance, a user may specify that the action words are key words and/or key phrases that are used within an organization to identify topics of interest. In some examples, the action words may be stored as meeting data 132. In some configurations, the transcript data 134 for the meeting is parsed by the meeting summary service 120 to identify occurrences of the predefined list of action words. The meeting summary service 120 may tag the identified action words and include one or more utterances surrounding such key words/phrases as action items.

Figure 2:
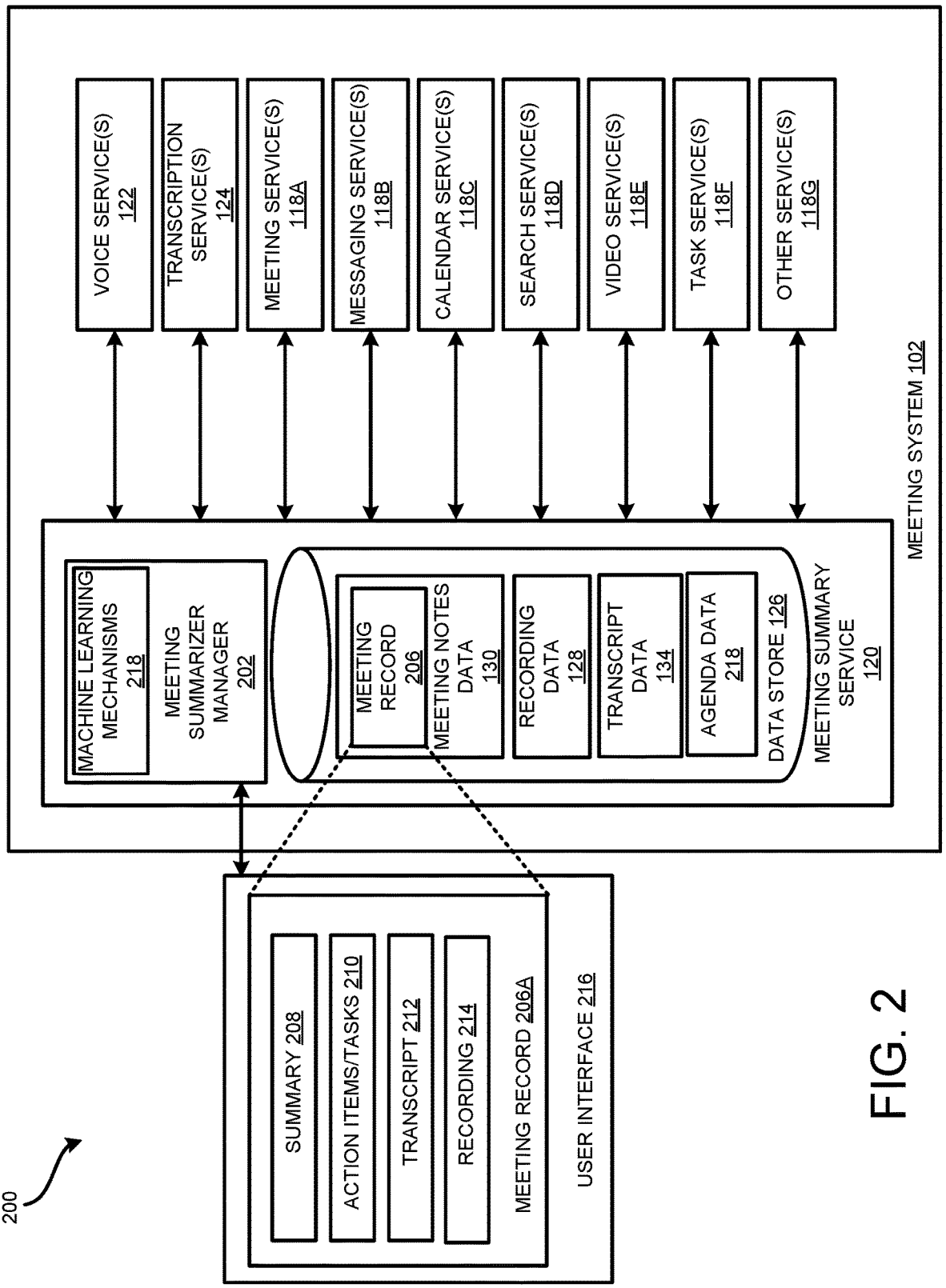
FIG. 2 is a software and network architecture diagram showing aspects of a meeting system that utilizes various services associated with a service provider to generate meeting notes.

As discussed above, one or more machine learning mechanisms may be utilized to identify, or assist in identifying, the action items, generating summary information for the meeting and/or different portions of the meeting, and the like (more details are provided with regard to FIG. 2).

In some configurations, the meeting summary service may use natural language processing (NLP) and/or natural language understanding (NLU) techniques to identify content that was discussed during the meeting. According to some configurations, the NLP and/or NLU techniques may identify that the participants are discussing content associated with an agenda item associated with the meeting, and/or content that is associated with another topic not related to an agenda item.

In some examples, the meeting summary service 120 may join the meeting at the scheduled time, via audio, video, or both. In other examples, a participant, may request the meeting summarizer to join a meeting. For instance, as discussed above, a user 110, may send an invite to the meeting summary service, or say to a meeting summary service "Summarizer, join the meeting". Once joined, the meeting summary service may cause a recording of the meeting to be generated. The meeting summary service 120 may also utilize cameras and/or other sensors to obtain additional information during the meeting. For instance, the meeting summary service 120 may obtain video footage of participants speaking during the meeting. This video footage may then be used by the meeting summary service 120 (e.g., using functionality of a video recognition service) to identify who was speaking during portions of the meeting, to identify an intended recipient of the speaker during portions of the meeting, and to associate content within the transcript with the correct speaker and/or the intended recipient. According to some configurations, the meeting summary service 120 may determine how active a participant was during the meeting by determining how much the participant spoke, or was spoken to, during the meeting.

According to some configurations, the meeting summary service 120 causes data to be indexed that is associated with the meeting within a search index. In this way, a user may locate the relevant meeting content more quickly. Similarly, a user may access the meeting record to interact with the meeting notes generated by the meeting summary service, view/interact with the presentation material, and the like.

According to some examples, the meeting summary service 120 may provide data to the meeting device 114, or some other device to audibly output information about the meeting. In other examples, the meeting summary service 120 may transmit data to the meeting device 114, or some other device, or service such as to cause a recording to be generated, video be taken, and the like.

In the current example illustrated in FIG. 1, the meeting summary service has caused meeting content 106 to be presented on display 110 during the discussion of agenda item 2. The meeting content 106 may be any type of content that can be presented on the display 110, or some other computing device. The meeting summary service via one or more computers of the meeting system 102 may also cause the meeting content 106 to be provided to one or more remote devices associated with one or more remote participants of the meeting.

According to some configurations, the meeting summary service 120 may generate a meeting record that can be stored as meeting data 132 in data store 126, or some other location. As described above, a meeting record can include an audio and/or video recording of the meeting, a transcript of the meeting, content presented or discussed during the meeting, follow-up items, and the like. In contrast to just creating a recording of the meeting, the meeting summary service 120, or some other component or service, may generate a meeting record and associate different parts of the meeting data 132 with the different agenda items. In this way, a user 110 may locate the relevant content more quickly. Similarly, a user 110 may access the meeting record to see the presentation material, any follow-up items, and the like.

According to some configurations, the meeting summary service attempts to determine an identity of a user 110 providing the speech. For instance, the meeting summary service 120 may be configured to identify the speech of employees of a company, other authorized users, and the like. In this way, when the user authorizes access to their data via an "opt-in" authorization procedure, the meeting summary service may determine data that are associated with the user. For instance, the meeting summary service may identify one or more calendars, messaging applications, task lists, and the like that are associated with the user 110.

In some configurations, the meeting summary service 120 identifies action items/tasks from the meeting. For example, the meeting summary service 120 may identify a task from the transcript, audio, video associated with the meeting, and/or from some other source. In some cases, the meeting summary service 120 may parse the transcript of the meeting to identify one or more key words to identify an action item/task (e.g., "follow up with same", "new meeting", "finish project", "send message", and the like). The meeting summary service 120 may also identify the target of the action item. As used herein, the "target" is one or more users to which the action item/task is assigned. In some examples, the meeting summary service 120 may identify the target based on a determination of who is talking and/or from an identification of the target (e.g., from the transcript).

The meeting summary service 120 may store tasks and/or utilize some other component and/or service to assist in managing the tasks. For example, the meeting summary service 120 may utilize an API to communicate with a task service and assign a task to one or more of the users 111, make changes to a task, mark a task as complete, and the like. In some configurations, the tasks may be stored in a task list within data store 126, or at some other location.

As an example, during a meeting, a user 110 may request that an action item be created (e.g., "Assign pages 1-10 of document to Jane", "Schedule meeting between Frank and Linda", . . . ). In some cases, an action item/task may be assigned to one or more of the users 110 (that may or may not be attending the meeting). In response to detecting the task assignment, the meeting summary service 120 may assign one or more task(s) to participants, schedule a follow-up meeting, and the like. In other examples, the meeting summary service 120 may automatically generate one or more tasks based on information identified during the meeting. For example, the meeting summary service 120 may determine that a particular agenda item was not covered during the meeting and assign a task to a user 110 that was supposed to present that agenda item to schedule another meeting to cover the agenda item, send a summary of what was planned to be covered, and the like. The meeting summary service 120 may also identify requests from participants to perform an action item/task. As another example, a user 110 may make a request during the meeting to remind them to make changes to a document and provide those changes to the meeting participants. In response to identifying this request, the meeting summary service 120 may assign one or more tasks to the requesting user.

The meeting summary service 120 may also provide a way for users 110 to interact with the action items/tasks generated from the meeting. In some examples, the meeting summary service 120 may keep track of the state of the tasks (e.g., newly assigned, how long the task has been open, expected completion date, completed, and the like). The meeting summary service 120 may also make the tasks viewable by the users 110 that attended the meeting, and/or other authorized users. For example, a user 110 may utilize a user interface to view tasks assigned to them, as well as view other tasks assigned to other users 110. As briefly discussed above, the meeting summary service 120 may utilize one or more other services, such as a task service, to assist in managing the tasks.

In some configurations, the meeting summary service 120 may utilize a calendar service to schedule a follow-up meeting (e.g., book one or more conference rooms), and send a meeting invitation to users 110 identified to attend the meeting. Similarly, the meeting summary service 120 may utilize a messaging service to send/receive message from users 110.

According to some examples, the meeting summary service 120 may access other available services 118 to obtain data that may be used by the meeting summary service 120 (See FIG. 2 and related discussion). Additional details regarding the various processes described above with regard to FIG. 1 will be provided below with regard to FIGS. 2-9.

FIG. 2 is a software and network architecture diagram showing aspects of a meeting system 102 that utilizes various services 118 associated with a service provider network to generate meeting notes using a meeting summary service 120 and other services associated with the service provider network, or some other entity. It is to be appreciated that the environment 200 is merely illustrative and that the various configurations disclosed herein can be utilized in many different types of computing environments. FIG. 2 is similar to FIG. 1 but provides more details regarding the meeting record 206A and different services 118 that can be utilized by the meeting system 102.

As illustrated, meeting system 102 includes meeting summary service 120, voice service 122, transcription service(s) 124, meeting service(s) 118A, messaging service(s) 118B, calendar service(s) 118C, search service(s) 118D, video service(s) 118E, task service(s) 118F, and other service(s) 118G. The meeting summary service 120 may communicate with the services using one or more Application Programming Interfaces (APIs) (not shown) exposed by one or more of the services. In some examples, each service may expose one or more APIs that can be used by the meeting summary service 120, or some other component, to access functionality and/or data provided by the service.

As briefly discussed above, the meeting summarizer manager 202 and/or the meeting summary service 120 may also access other service(s) to assist in recording the meeting, generating meeting notes, and sharing the meeting notes. According to some configurations, the meeting summary service 120 is configured to access calendar service(s) 118C to obtain data of one or more work calendars, or other calendars, associated with the meeting summary service 120, and/or one or more of the users 110. For example, calendar data provided by calendar service(s) 118C may be used by the meeting summary service 120 to determine when to attend a meeting.

The meeting summarizer manager 202 may also access and utilize functionality provided by one or more meeting service(s) 118A. For instance, the meeting summarizer manager 202 may send/receive messages to one or more meeting platforms/services 118A. In some examples, the meeting summarizer manager 202 utilizes the one or more meeting service(s) 118A to cause a recording to be captured during a meeting and/or obtain other information about the meeting (e.g., participants, locations, agenda items, . . . ).

According to some examples, the meeting summarizer manager 202 may also access one or more messaging service(s) 118B. For instance, the meeting summarizer manager 202 may send messages using one or more of the messaging service(s) 118B to indicate that meeting notes are available to view. The meeting summarizer manager 202 may also send messages using one or more of the messaging service(s) 118B to indicate that one or more tasks have been assigned to a user and/or completed. The meeting summary service 118B may also access messaging data received from one or more of the messaging service(s) 118B to identify content associated with one or more meetings. In other configurations, an authorized user, such as user 110, may authorize ("opts-in") the meeting summary service 120 access to content of messages (e.g., emails, text messages, . . . ) of one or more of the users 110. According to this example, the meeting summary service 120 may access the content of one or more messages of the user 110 to determine message content that indicates meeting information associated with one or more meetings.

According to some configurations, the meeting summary service 120 may also access one or more search service(s) 118D. As briefly discussed above, the meeting summary service 120 may utilize the search service(s) 118D for including data associated with the meeting record 208 in one or more search indexes that is searchable by one or more of the search service(s) 118D. In some examples, a user 110 may search for meeting content by issuing a query to one or more search service(s) 118D.

The voice service 122 may include a voice interface that may comprise one or more components configured to receive audio signals generated by the meeting device 114 and perform ASR, NLP, and/or NLU on the audio signals to identify users and voice commands.

In some examples, the meeting summarizer manager 202 stores recording data 128 associated with the recording of the meeting within data store 126. The recording data 128 may include audio and/or video data. The meeting summarizer manager 202 may cause the transcription service(s) 124 to generate a transcription of the meeting. In some examples, a user, such as the meeting organizer, may edit the machine transcription. For instance, the meeting summarizer manager 202 may present the transcript 212 within user interface 216 for editing/viewing.

After generating the transcript 212 via the transcription service(s) 124 and/or the voice service(s) 122, the meeting summarizer manager 202 may generate meeting notes data 130. As discussed above, the meeting notes data 130 may include a variety of different information that may be determined using one or more mechanisms. In some configurations, the transcript data 134 associated with the meeting may be parsed by the meeting summary service to identify a predefined list of action words. As also discussed above, machine learning mechanisms may be utilized to identify, or assist in identifying, the action items, generating summary information for the meeting and/or different portions of the meeting, and the like.

As illustrated in FIG. 2, the meeting summarizer manager 202 may utilize one or more machine learning mechanisms 218 to generate portions of the meeting record 206. For the purposes of this discussion, any type of machine learning model/technique and/or predictive model may be used to determine, calculate, generate, predict, etc., the data (e.g., the meeting notes) described herein. Examples of predictive models that may be utilized include group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, examples of machine learning techniques may include supervised learning, unsupervised learning, semi-supervised learning, classification analysis, regression analysis, clustering, etc. Moreover, any other types of algorithms may also be used.

In some examples, supervised learning that utilize a logistic regression classifier using N-grams (a number of words) of an utterance as features may be utilized by the meeting summarizer manager 202. Generally, an N-gram model is used to predict a probability of a word based on a previous N−1 words that occur before the word (e.g., when N=3 the probability is based on the previous two words). In some examples, the meeting summary service may utilize a classifier to classify each sentence (or some other portion of the text) as either an action item or non-action item. According to some configurations, deep learning may also be utilized. Generally, deep learning refers to machine learning methods based on artificial neural networks. For instance, supervised deep learning methods may be utilized to perform end-to-end learning. Deep learning approaches have demonstrated capability of recognizing semantically similar sentences in various NLP tasks. These deep learning mechanisms lead to more accurate extractive summarization than the previous two approaches.

In some examples, agenda data 218 may be utilized by the meeting summary service 120 to assist in identify different topics discussed during the meeting. The agenda data 218 may include various information about a meeting. For example, the agenda data 218 may include but is not limited to a summary of the meeting, agenda items, summary of agenda items, presentation material associated with agenda items, a list of meeting participants, a meeting start time, a meeting end time, durations for agenda items, and the like. In some configurations, the agenda data 218 may be included (or linked or identified in some other manner) in a meeting invitation that is sent to the meeting summary service 120 by a messaging service 118B, a calendar service 118C, and/or associated with a calendar, mailbox, or some other data store that is accessible by the meeting summary service 120.

According to some examples, the agenda data 218 can be structured using simple annotations, created using one or more templates, created using a meeting agenda generation tool, and the like. For example, a user may select a template and supply information about the meeting to create a meeting agenda for a meeting. In some configurations, meeting agenda items can be listed as bullet items, numerated items, and/or labeled using some other format such that the agenda items for the meeting can be determined. Generally, any format may be utilized that is understood by functionality accessed by the meeting summary service.

As an example, the agenda data 218 may include a title of the meeting, a time for the meeting (e.g., 1 hour), and a summary of the meeting (e.g., "Develop Inventory Software") and agenda items. The agenda items may be listed as numerated items and include a title of the agenda item along with a desired duration for discussing the agenda item. In other examples, the agenda items may include other information, such as but not limited to summary information, user information, and the like. The agenda data 218 may identify presentation material that is associated with one or more of the agenda items. For example, the agenda data 218 may include links to content (e.g., documents, slides, videos, pictures, audio, . . . ).

As also briefly discussed, the meeting summary service 120 may identify action items (e.g., a follow-up meeting is to be scheduled, a task is to be assigned to one or more users, . . . ). In some examples, the meeting summary service 120 can utilize the meeting summarizer manager 202 to provide an option (e.g. within user interface 216) to view and edit (e.g., change the task to completed, remove the task, update the task), schedule a follow-up meeting (e.g., book one or more conference rooms), send a meeting invitation to the participants with the agenda topic(s) to be covered in the follow-up meeting, and the like. In some examples, the meeting summary service 120 may utilize a task service(s) 118F, or some other component or device to assist in managing tasks.

According to some configurations, the meeting summarizer manager 202 can be utilized to generate a meeting record 208 for the meeting. In some examples, the meeting record 208 is stored as meeting data 152 in the data store 126. In some examples, a meeting record 208 can include an audio and/or video recording of the meeting, a transcript of the meeting, content presented or discussed during the meeting, follow-up items, and the like. In contrast to just creating a recording of the meeting, the meeting record 208 may associate different parts of the recording with the different agenda items. According to some examples, the meeting summarizer manager 202 utilizes one or more transcription services 118A to generate transcript data 130 for the meeting. In this way, a user may locate the relevant content more quickly. Similarly, a user may access the meeting record to see the presentation material, any follow-up items, and the like.

In some configurations, the other service(s) 118G may include a vision service that may include a vision interface to identify requests of users 110 made via user gestures and route the requests to the appropriate domain. In some examples, the vision service may be used by the meeting summarizer manager 202 to identify and/or authenticate a user. The other service(s) 118G may provide other functionality not specifically discussed herein.

FIG. 3A is a block diagram showing an illustrative graphical user interface that may be utilized to view and search meeting notes generated for a meeting. In some examples, the user views and interacts with meeting records 206 via a graphical user interface (GUI). In other examples, the user may use a command line interface, or utilize an Application Programming Interface (API). In some instances, the meeting summary service 120 may provide data for displaying a GUI to a display associated with a user computing device (not shown).

In the example illustrated in FIG. 3A, GUI 300 shows user interface (UI) elements related to a meeting record. More or fewer UI elements may be included within GUI 300. As illustrated, the GUI 300 includes meetings 302 UI elements that allows a user 110 to select a meeting record to display (e.g., a meeting record for meeting 302A), a search UI element 304 to enter one or more search terms to locate content within a meeting record. According to some configurations, the meeting may be associated with a group of meetings, such as a recurring meeting (e.g., daily, weekly, monthly, . . . ). In the current example, GUI 300 shows a recurring meeting 302A that includes meeting M1 302A(1), meeting M2 302A(2), and meeting M3 302A(1). According to some configurations, the display of the GUI 300 may change depending on what meeting is selected. For instance, when meeting 302A element is selected the action items 310 displayed may include the action items determined from each of the meetings. In the current examples, action item 1 was assigned at meeting M1, and action item 2 was assigned at meeting M3. When an individual meeting, such as meeting M1 302A(1) is selected, the action items 310 for that particular meeting may be just shown. In this way, the user may easily access meeting notes and information associated with more than one meeting within GUI 300, or some other UI.

A meeting summary UI element 306 may also be provided that display summary information associated with a meeting. The summary information may include a summary of all/portion of the meeting. The edit summary UI element 308 when selected is used to edit the summary information. For instance, a user 110 may select the UI element 308 to change an automatically generated summary of the meeting and/or a portion of the meeting.

GUI 300 also includes an action items UI element 310 that presents the identified action items. For example, the action items 310 may include a list of the action items identified. The current example shows two different action items, but many more action items may be identified. The action item may also show who has been assigned the action item. In the current example, user 1 has been assigned to complete item 1, and users 1 and 3 have been assigned to complete item 2. The user may utilize add item 312A UI element to add another action item and delete item 312B UI element to delete an action item. Edit item 312C may be utilized by a user to make changes to a particular action item. For example, the user may select edit item 312C to assign the task to a different user (e.g., the meeting summary service incorrectly identified the user to be assigned the task, the user wants to re-assign the task, and the like). The user may also use the edit item 312C UI element to change one or more other aspects of the action item (e.g., actions to be performed, times, dates, . . . ).

In some examples, when an action item is selected (as indicated by a checkmark), the meeting summary service may cause a portion of the transcript 212 to be displayed within the transcript 314 UI element. For example, selecting the first action item may cause the action item to be displayed (along with content before and after the action item). The edit transcript UI element 316 when selected is used to edit the transcript information. The transcript 314 UI element may also be utilized by the user 110 to view other portions of the transcript 212.

The recording UI element 318 allows the user 110 to play different portions of the recording 214. In some examples, when an action item is selected (as indicated by a checkmark), the meeting summary service 120 may cause the portion of the recording 214 near the action to be played and/or queued for playing.

The share UI element 324 allows the user 110, such as the meeting organizer, to share the meeting record with one or more other users. In some examples, a message is sent by the messaging service 118B to indicate that a meeting record has been shared.

FIG. 3B is a block diagram showing an illustrative graphical user interface that may be utilized to view and search action items associated with a particular user. As discussed above, in some instances, the meeting summary service 120 may provide data for displaying a GUI to a display associated with a user computing device (not shown).

In the example illustrated in FIG. 3B, GUI 330 shows user interface (UI) elements related to a meeting record and action item 310 UI elements not illustrated in FIG. 3A. More or fewer UI elements may be included within GUI 330. As illustrated, the GUI 330 includes meetings 302 UI elements that allows a user 110 to select a meeting record to display (e.g., a meeting record for meeting 302B as indicated by the bolding of MEETING), a search UI element 304 to enter one or more search terms to locate content associated with a meeting record. A meeting summary UI element 306 may also be provided that display summary information associated with a meeting. The summary information may include a summary of all/portion of the meeting. The edit summary UI element 308 when selected is used to edit the summary information. For instance, a user 110 may select the UI element 308 to change an automatically generated summary of the meeting and/or a portion of the meeting.

GUI 330 also includes an action items UI element 310 that presents action items that are identified from a meeting and assigned to one or more users. For example, the action items 310 may include a list of the action items identified, along with an identification of which user(s) were assigned the action item, and whether or not the action item has been completed. The current example shows four different action items that were identified during the meeting 302B, but more or fewer action items may be identified. In the current example, the GUI 330 illustrates the action items assigned to the user utilizing the GUI 330, which in this particular example is user 1. Looking at action items 310 it can be seen that user 1 has been assigned to complete items 1-4, and that user 3 has also been assigned to complete item 2. The user 1 may utilize a selection UI element 334 to indicate that a particular action item is completed. In the current example, the user has selected the UI element 334 to indicate that action item 3 has been completed. The user may utilize add item 312A UI element to add another action item and delete item 312B UI element to delete an action item.

In some examples, when an action item is selected (as indicated by a checkmark), the meeting summary service may cause a portion of the transcript 212 to be displayed within the transcript 314 UI element. For example, selecting the first action item may cause the action item to be displayed (along with content before and after the action item). The edit transcript UI element 316 when selected is used to edit the transcript information. The transcript 314 UI element may also be utilized by the user 110 to view other portions of the transcript 212.

The recording UI element 318 allows the user 110 to play different portions of the recording 214. In some examples, when an action item is selected (as indicated by a checkmark), the meeting summary service 120 may cause the portion of the recording 214 near the action to be played and/or queued for playing.

The update UI element 336 allows the user 110, such as user 1, to update the meeting record to reflect completion of an action item and/or a change to some other portion of the meeting record. In some examples, a message is sent by the messaging service 118B to indicate that a meeting record has been updated.

FIG. 3C is a block diagram showing an illustrative graphical user interface that may be utilized to view and search action items associated with meeting notes. As discussed above, in some instances, the meeting summary service 120 may provide data for displaying a GUI to a display associated with a user computing device (not shown).

In the example illustrated in FIG. 3C, GUI 360 shows user interface (UI) elements related to a meeting record and action item 310 UI elements not illustrated in FIG. 3A or FIG. 3B. More or fewer UI elements may be included within GUI 360. As illustrated, the GUI 360 includes meetings 302 UI elements that allows a user 110 to select a meeting record to display (e.g., all meetings 302 associated with a user (e.g., user 1) as indicated by the bolding of MEETINGS 302), a search UI element 304 to enter one or more search terms to locate content associated with a meeting record. A meeting summary UI element 306 may also be provided that display summary information associated with a meeting. The summary information may include a summary of all/portion of the meeting. The edit summary UI element 308 when selected is used to edit the summary information. For instance, a user 110 may select the UI element 308 to change an automatically generated summary of the meeting and/or a portion of the meeting.

GUI 330 also includes an action items UI element 310 that presents action items that are identified from a meeting and assigned to one or more users. For example, the action items 310 may include a list of the action items identified, along with an identification of which user(s) were assigned the action item 332, what meeting the action item was identified 338, and whether or not the action item has been completed. The current example shows N different action items that were identified during the meetings, but more or fewer action items may be identified. In the current example, the GUI 360 illustrates the action items assigned to users. Looking at action items 310 it can be seen that user 1 has been assigned to complete items 1-3, and N, and that user 3 has also been assigned to complete item 2. Action items 310 also shows an action item 4 that was not assigned to the user 1. The user 1 may utilize a selection UI element 334 to indicate that a particular action item is completed. In the current example, the user has selected the UI element 334 to indicate that action item 3 has been completed. In some configurations, when all the action items are completed for a meeting, or a series or meetings, the meeting summary service 120 may provide the meeting organizer, and/or other users 110 a message or some other indication that all of the action items are completed. The user may utilize add item 312A UI element to add another action item and delete item 312B UI element to delete an action item.

The update UI element 336 allows the user 110, such as user 1, to update the meeting record to reflect completion of an action item and/or a change to some other portion of the meeting record. In some examples, a message is sent by the messaging service 118B to indicate that a meeting record has been updated.

Figure 4:
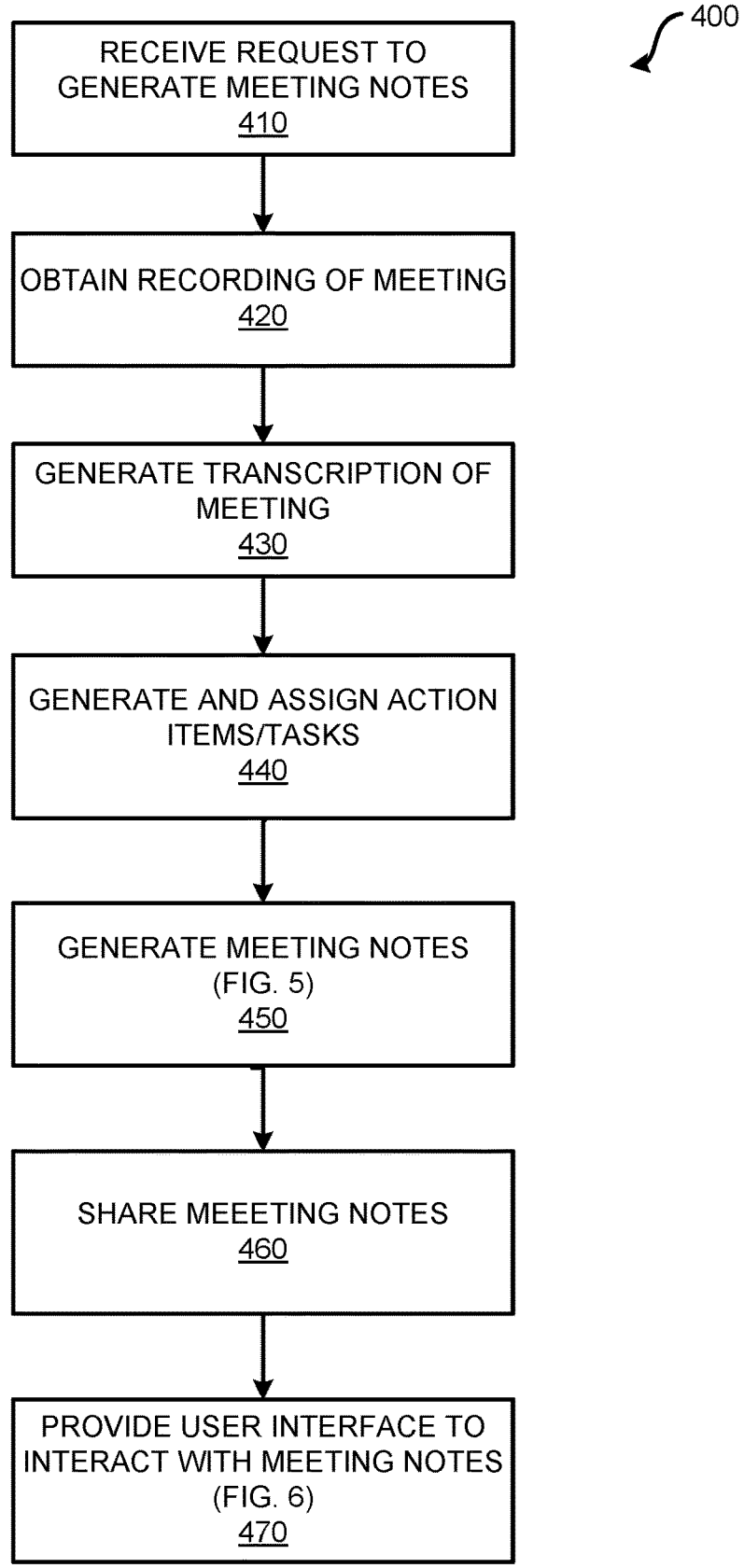
FIG. 4 is a flow diagram showing an illustrative routine for utilizing a meeting summary service to generate meeting notes.
Figure 5:
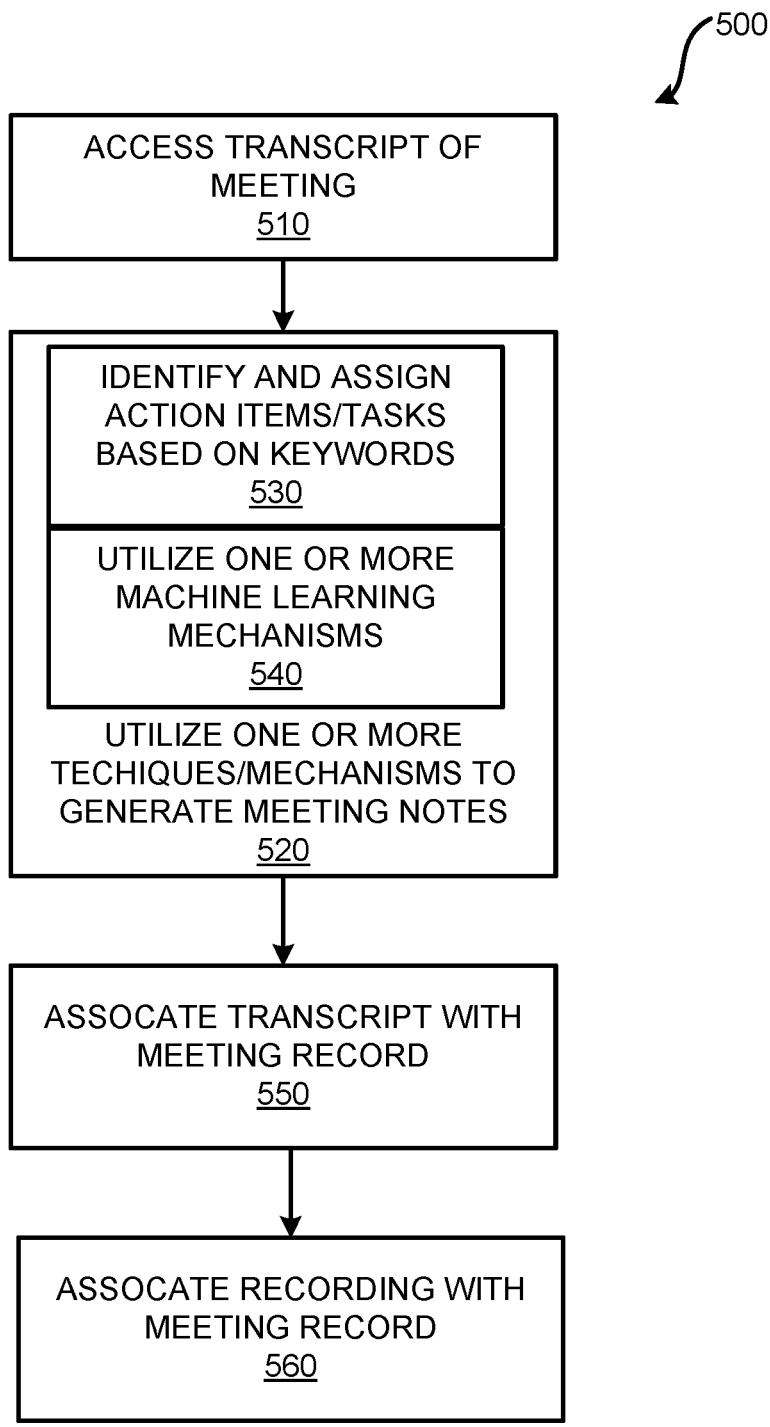
FIG. 5 is a flow diagram showing an illustrative routine for generating meeting notes.
Figure 6:
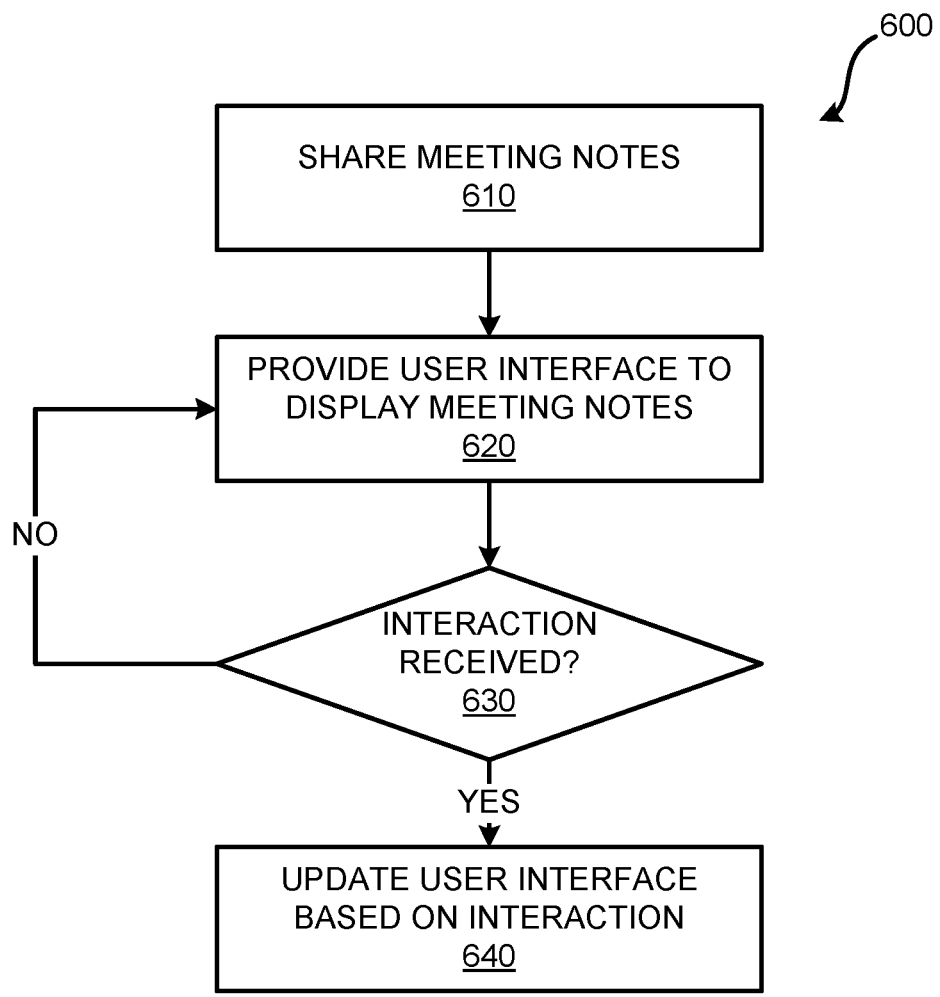
FIG. 6 is a flow diagram showing an illustrative routine for providing a user interface to interact with meeting notes.

FIGS. 4-6 are flow diagrams showing illustrative routines 400, 500, and 600 for utilizing a meeting summary service to generate meeting records, according to examples disclosed herein. It should be appreciated that the logical operations described herein with respect to FIG. 4, FIG. 5, FIG. 6, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine for utilizing a meeting summary service to generate meeting notes. At 410, a request for a meeting summary service 120 to generate meeting notes is received. As discussed above, a user 110 may provide a voice command that requests the meeting summary service 120 to attend a meeting and generate meeting notes, the meeting summary service 120 may receive a request via a meeting invitation, the meeting summary service 120 may receive a request via a user interface (UI), or the like. Generally, the voice command, or the meeting invitation, or the request via the UI, includes one or more terms, or other data, provided by the user 110 that are used by the meeting summary service 120 to identify whether the meeting summary service is requested to attend the meeting and/or to utilize previously recorded data to generate the meeting notes. In some examples, a user interface can be provided for submitting the request to the meeting summary service 120.

At 420, a recording of the meeting is obtained. As discussed above, the meeting summary service 120 may record or cause the meeting to be recorded, or the meeting summary service 120 may access previously recorded data. In some examples, the meeting device 114 generates the recording data 128 for the meeting. The recording data 128 may include audio and/or video data.

At 430, a transcription of the meeting is generated. As discussed above, the meeting summary service 120 may request a voice service 122 and/or a transcription service 124 to generate a transcript 212 and to store the transcript data 134 within the data store 126.

At 440, tasks are generated and assigned. As discussed above, the meeting summary service 120 may identify action items/tasks from meeting notes for the meeting and/or from audio/video associated with the meeting, and/or form some other source (e.g., a user 110 of the meeting assigns a task using a UI, or some other mechanism). In some examples, the meeting summary service 120 identifies key words, and/or utilizes a machine learning mechanism to generate the tasks. According to some configurations, the meeting summary service 120 may utilize a task service to assist in managing the tasks associated with one or more meetings.

At 450, meeting notes are generated. As discussed above, the meeting summary service 120 may generate meeting notes for the meeting. In some examples, the meeting notes The meeting notes generated by the meeting summary service 120 can include a variety of information such as participant information (e.g., who attended the meeting, where the participants were located, . . . ), meeting information (e.g., time, place, location, . . . ) meeting agenda information (e.g., topics of the meeting), identified action items, a transcript of the meeting, a recording of the meeting, meeting content presented and/or distributed during the meeting, and the like. More details are provided below with reference to FIG. 5.

At 460, the meeting notes are shared. As discussed above, the meeting summary service 120 may share the meeting notes with one or more other users, such as participants of the meeting. For instance, the meeting summary service 120 may utilize a messaging service 118B to send users a message indicating that the meeting notes are available for viewing.

At 470, a user interface is provided to interact with the meeting notes. As discussed above, the users with whom the meeting notes have been shared may utilize a user interface, and/or a meeting summary service 124, to search, identify, recall, and replay parts of the meeting. For example, a user may view the meeting notes within a graphical user interface (GUI), such as the GUIs illustrated in FIG. 3A, FIG. 3B, and FIG. 3C. More details are provided below with reference to FIG. 6.

FIG. 5 is a flow diagram showing an illustrative routine 500 for generating meeting notes, according to examples disclosed herein.

The routine 500 begins at 510, where the transcript of the meeting is accessed. As discussed above, the meeting summary service 120, and/or some other component or service, may access the transcript data 134 that is associated with a meeting. In some configurations, the transcript data 134 may be stored in a data store 126 associated with the service provider network.

At 520, one or more techniques/mechanisms may be utilized to generate meeting notes for the meeting. As discussed above, different techniques/mechanisms may be utilized to generate the meeting notes. In some configurations, at 530, key words and/or key phrases (which may be provided by a meeting organizer or some other user) may be utilized by the meeting summary service 120 to identify action items within the transcript. According to some examples, the transcript 212 of the meeting is parsed by the meeting summary service 120 to identify the predefined list of action words. The meeting summary service may tag the identified action words and include one or more utterances surrounding such key words/phrases as action items.

According to some examples, at 540, one or more machine learning mechanisms may be utilized to identify, or assist in identifying, the action items, generating summary information for the meeting and/or different portions of the meeting, and the like. In some examples, supervised learning that utilize a logistic regression classifier using N-grams (a number of words) of an utterance as features may be utilized by the meeting summary service 120. According to some configurations, the meeting summary service 120 may utilize a classifier to classify each sentence (or some other portion of the text) as either an action item or non-action item. According to some configurations, deep learning may also be utilized.

At 550, the transcript 212 is associated with the meeting record. As discussed above, the meeting summary service 120 may associate all/portion of the transcript 212 with the meeting record. In some examples, the meeting summary service 120 tags the transcript such that the identified action items are associated with the relevant portions of the transcript.

At 560, the recording 214 is associated with the meeting record. As discussed above, the meeting summary service 120 may associate all/portion of the recording 214 with the meeting record. In some examples, the meeting summary service 120 creates metadata that identifies what portions of the recording 214 are associated with the identified action items.

FIG. 6 is a flow diagram showing an illustrative routine 600 for providing a user interface to interact with meeting notes, according to examples disclosed herein.

At 610, the meeting summary service 120 shares the meeting notes. As discussed above, the meeting summary service 120 may provide a message to the users that the meeting notes are available or provide some other indication that the meeting notes have been shared. U At 620, a user interface is provided to display the meeting notes to a user. As discussed above, the UI may be a GUI 300 that is presented on a display of computing device associated with the user. The user interface may be used to search, identify, recall, and replay parts of the meeting. For example, a user may view the meeting notes within a GUI, such as GUI 300 of FIG. 3, the GUI 330 illustrated in FIG. 3B, and the GUI 360 illustrated in FIG. 3C. In some configurations, the GUI shows information associated with the meeting record generated for the meeting. For instance, the GUI may show a summary of the meeting and/or a summary of various sections of the meeting, action items identified from the meeting, all/part of a transcript of the meeting, and all/part of a recording of the meeting. In other examples, a user may utilize a virtual assistant to interact with the meeting notes generated by the meeting summary service. For instance, a user may search the meeting notes using voice, and/or cause a portion of the meeting notes to be presented to the user (e.g., via a speaker and/or display).

At 630, a determination is made as to whether an interaction with the user interface has been received. As discussed above, a user may select an UI element within the UI to obtain information. When an interaction has not been received, the process returns to 620. When an interaction has been received, the process flows to 640.

At 630, the user interface is updated based on the interaction. As discussed above, various actions may occur when an interaction is received by the UI. For example, a user may highlight an action item presented within the UI and view the underlying raw transcript, listen to the audio recording, and/or view a video recording that is associated with the point of the meeting when the highlighted action item was discussed in the meeting.

Figure 7:
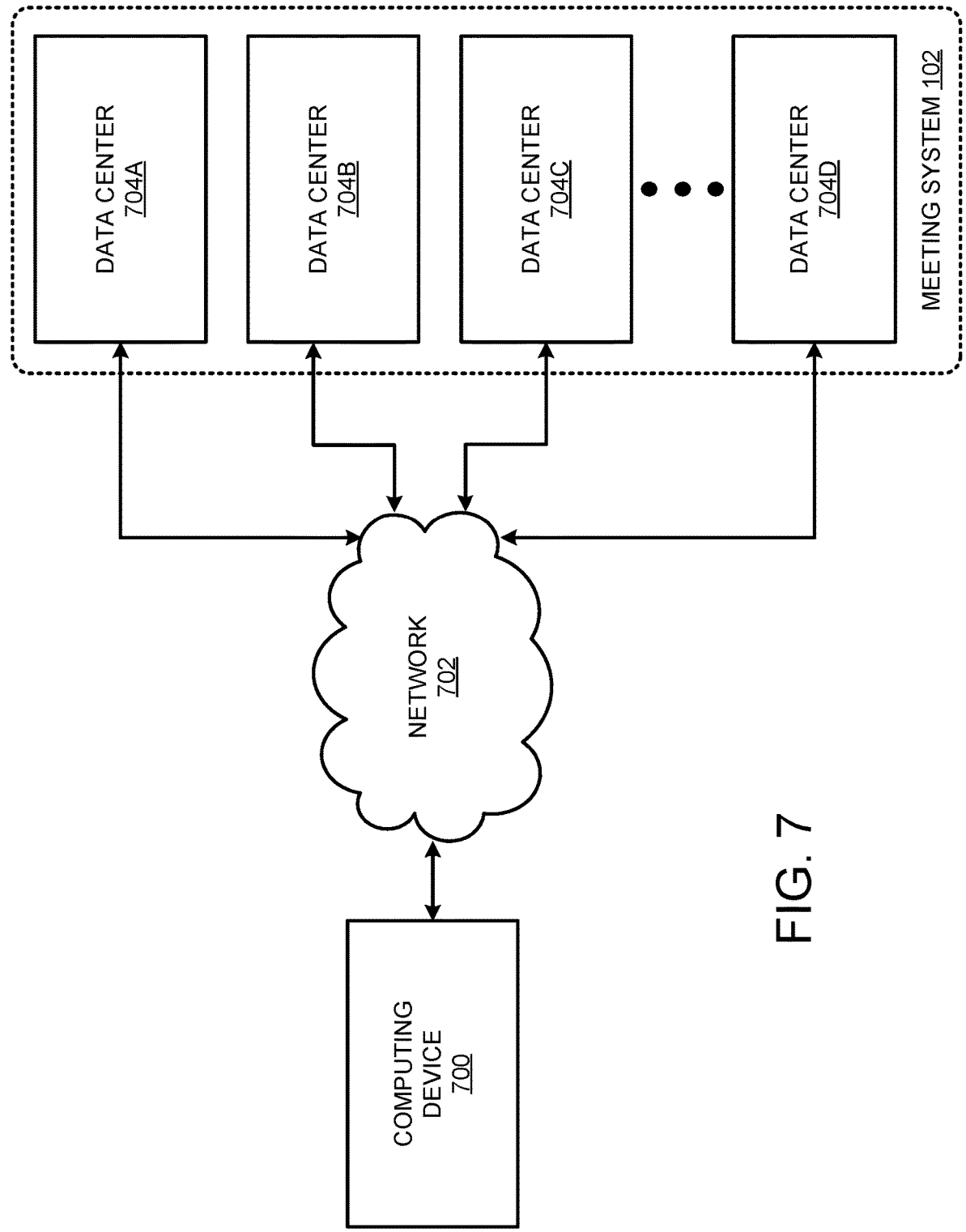
FIG. 7 is a system and network diagram that shows an illustrative operating environment including several data centers that can be configured to implement aspects of the functionality described herein.

FIG. 7 is a system and network diagram that shows one illustrative operating environment for the configurations disclosed herein that includes a meeting system 102 that can be configured to provide the functionality described above. As discussed above, the meeting system 102 can execute network services that provide computing resources for implementing the functionality disclosed herein. The computing resources implemented by the meeting system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The meeting system 102 can also include and utilize other types of computing resources not mentioned specifically herein.

As also discussed above, the computing resources provided by the meeting system 102 are enabled in one implementation by one or more data centers 704A-704D (which might be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 9.

The users can access the services provided by the meeting system 102 over a network 702, which can be a wide area communication network ("WAN"), such as the Internet, an intranet or an Internet service provider ("ISP") network or a combination of such networks. For example, and without limitation, a computing device 700 operated by a user or other user of the meeting system 102, such as the meeting device 114, can be utilized to access the meeting system 102 by way of the network 702. It should be appreciated that a local-area network ("LAN"), the Internet, or any other networking topology known in the art that connects the data centers 704 to remote users and other users can be utilized. It should also be appreciated that combinations of such networks can also be utilized.

Figure 8:
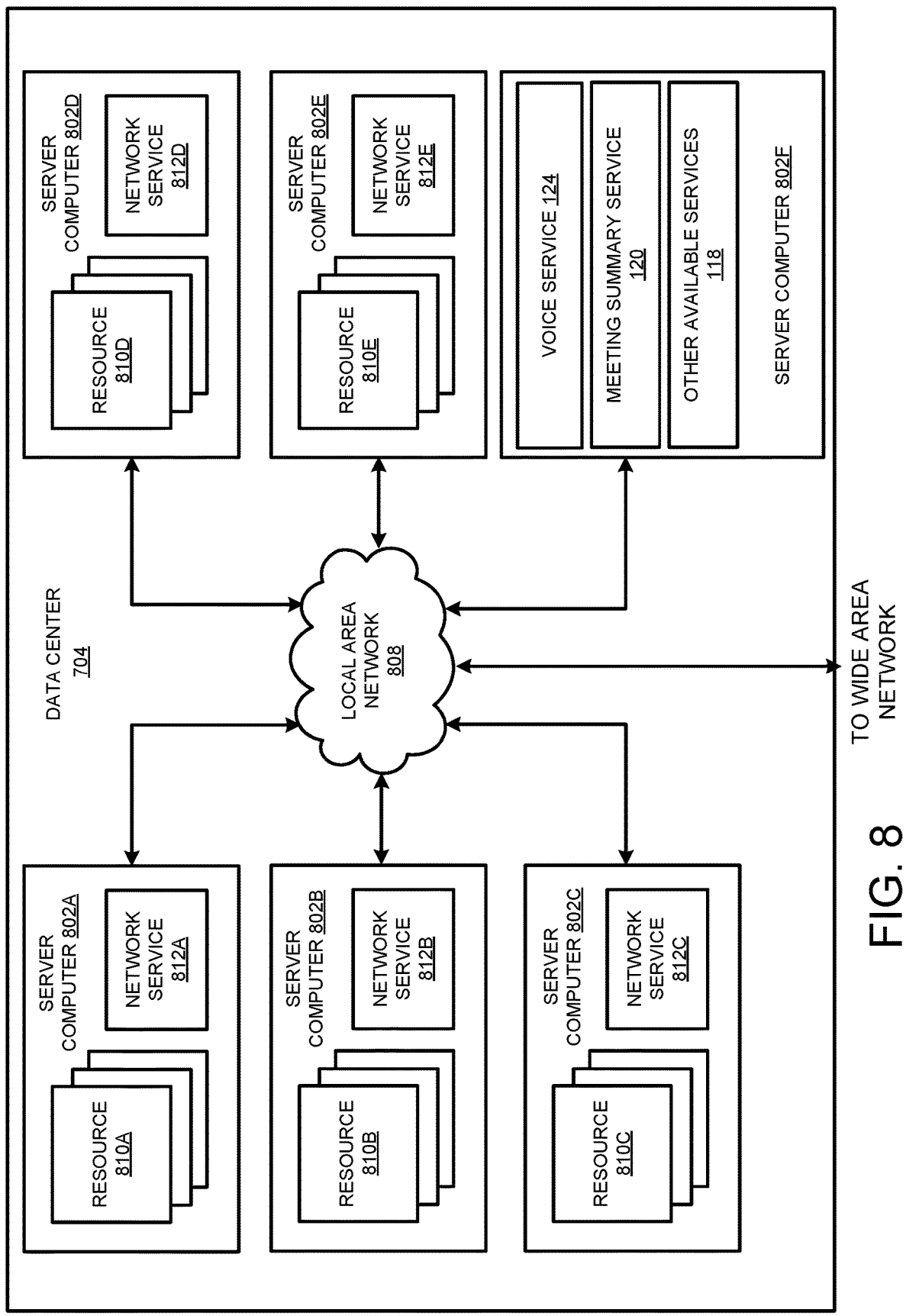
FIG. 8 is a computing system diagram illustrating a configuration for a data center that can be utilized to implement aspects of the technologies disclosed herein.

FIG. 8 is a computing system diagram that illustrates examples for a data center 804 that can be utilized to implement the voice service 123, the meeting summary service 120, other available services 118, and the other functionality disclosed herein. The example data center 804 shown in FIG. 8 includes several server computers 802A-802F (which might be referred to herein singularly as "a server computer 802" or in the plural as "the server computers 802").

The server computers 802 can be standard tower, rackmount, or blade server computers configured appropriately for providing various types of computing resources 810 for implementing the functionality disclosed herein. As mentioned above, the computing resources 810 provided by the data center 704 can be data processing resources such as VM instances or hardware computing systems, data storage resources, database resources, networking resources, and others. Some of the servers 802 can also be configured to execute network services 812A-812-E, respectively, capable of instantiating, providing and/or managing the computing resources 810A-810E.

The data center 704 shown in FIG. 8 also includes a server computer 802F that can execute some or all of the software components described above. The server computer 802F can also be configured to execute other components and/or to store data for providing some or all of the functionality described herein. In this regard, it should be appreciated that components or different instances of the services can execute on many other physical or virtual servers in the data centers 704 in various configurations.

In the example data center 704 shown in FIG. 8, an appropriate LAN 808 is also utilized to interconnect the server computers 802A-802F. The LAN 808 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704D, between each of the server computers 802A-802F in each data center 704, and, potentially, between computing resources 810 in each of the data centers 704. It should be appreciated that the configuration of the data center 704 described with reference to FIG. 8 is merely illustrative and that other implementations can be utilized.

Figure 9:
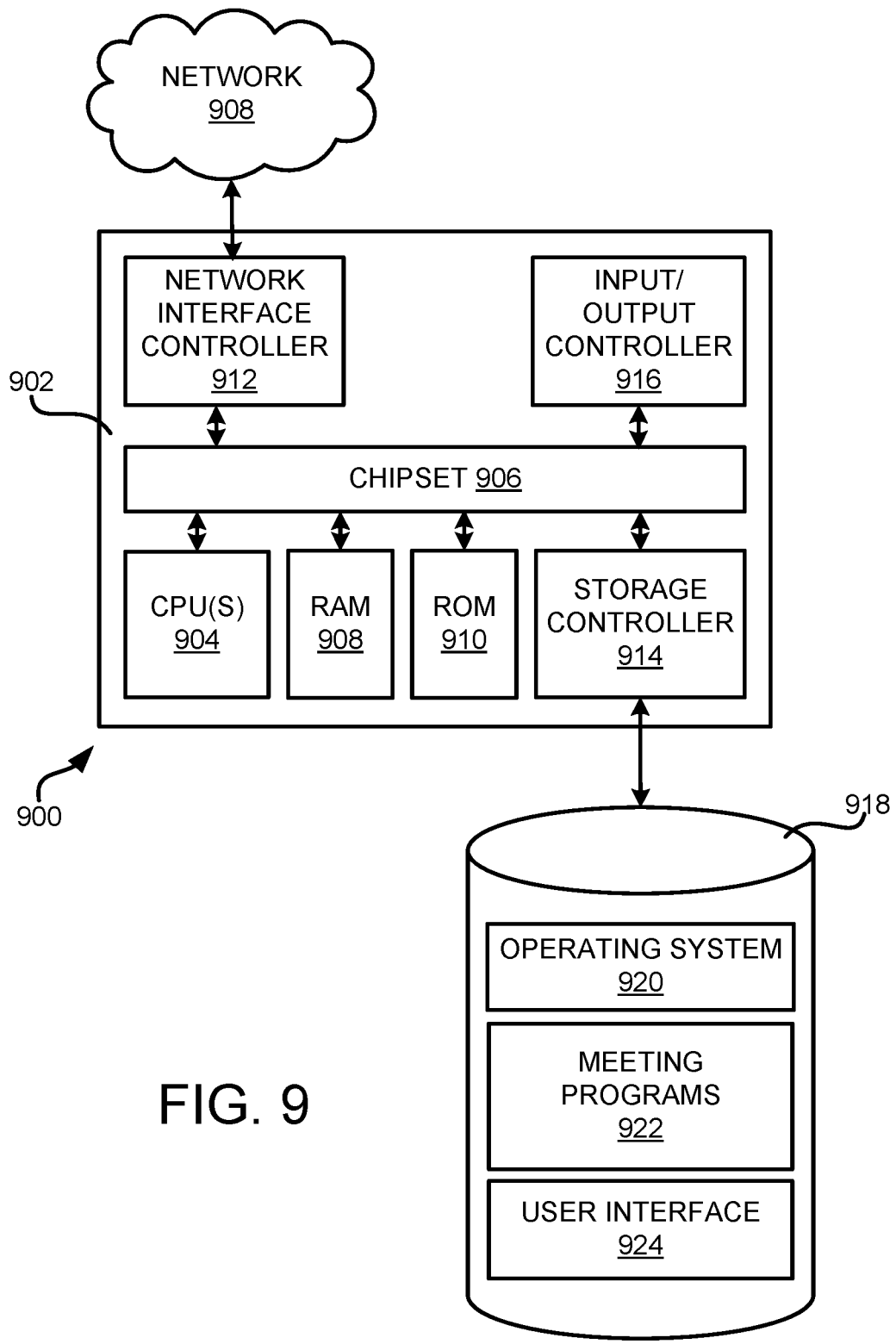
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, meeting programs 922 for providing functionality associated with the meeting system 102, user interface 924, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In examples, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to examples, the computer 900 has access to computer-readable storage media storing computer-executable instructions which, when executed by the computer 900, perform the various processes described above with regard to FIGS. 1-9. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for utilizing a meeting summarizer to generate meeting notes have been described herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
a non-transitory computer-readable storage medium having instructions stored thereupon which, when executed by the one or more processors, cause the system to:
cause a recording of a meeting to be generated, wherein the recording captures, via one or more microphones of a device at a physical location of the meeting, audio signals associated with speech that was uttered by participants during the meeting;
generate a meeting record of the meeting, wherein generating the meeting record includes performing actions to:
generate, from the recording, a transcript of the meeting by performing automatic speech recognition (ASR) on the audio signals;
identify action items from the transcript, wherein an action item identifies an action for at least one participant of the participants to complete after the meeting, and wherein the action item is determined based on one or more of an occurrence of a key phrase within the transcript or an output of one or more machine learning mechanisms that processes the transcript;
assign the action items to one or more of the participants; and
associate each of the action items with a respective portion of the transcript and the recording;
receive, from a computing device associated with a meeting organizer, edits to the meeting record; and
provide access to the meeting record via devices of one or more of the participants of the participants of the meeting.

2. The system of claim 1, wherein the instructions further cause the system to identify the participants of the meeting by performing one or more of speaker recognition on the audio signals and video signals obtained during the meeting and determining a participation rate of each of the participants based on an amount of speaking performed by each of the participants.

3. The system of claim 1, wherein the instructions further cause the system to index data of the meeting record within a search index, wherein the search index includes a plurality of meeting records and is searchable by one or more search engines that are configured to provide one or more results in response to a query requesting information about the meeting.

4. The system of claim 1, wherein the instructions further cause the system to:
cause one or more of the action items to be added to a task service associated with a first participant, wherein the task service is configured to manage tasks;
cause an electronic message to be delivered to the first participant that indicates an assignment of the one or more action items to the first participant;
identify that the one or more action items are completed; and
cause a second electronic message to be delivered to one or more of the participants that indicates the one or more action items are completed.

5. The system of claim 1, wherein the instructions further cause the system to provide for display of a graphical user interface (UI) that includes UI elements that are associated with a summary of the meeting, the action items identified from the meeting, a state of the action items, the transcript of the meeting, and the recording of the meeting, wherein in response to a selection of a UI element of the UI elements associated with an action item of the action items, a portion of the transcript is displayed within the graphical UI.

6. A computer-implemented method comprising:
accessing, via one or more computers, a recording of a meeting between participants;
causing, via the one or more computers, a transcript to be generated from the recording;
identifying, via the one or more computers, one or more action items from the transcript, wherein an action item identifies an action for one or more of the participants to complete after the meeting;
assigning at least one of the one or more action items to the one or more of the participants;
generating, via the one or more computers, a meeting record from the transcript, wherein the meeting record includes at least a portion of the transcript related to the one or more action items; and
causing, via the one or more computers, the meeting record to be accessible via one or more devices of one or more of the participants.

7. The computer-implemented method of claim 6, further comprising:
identifying, via the one or more computers, a request for a meeting summary service to attend the meeting; and
in response to the request, cause a meeting summarizer participant associated with the meeting summary service to join the meeting at a specified time and cause the recording to be generated.

8. The computer-implemented method of claim 6, wherein identifying the one or more action items comprises:
accessing stored data that identifies action words that indicate action items;
identifying the one or more action items by parsing the transcript to identify one or more of the action words; and
identifying the one or more participants to associate with the one or more action items.

9. The computer-implemented method of claim 8, wherein identifying the one or more action items comprises utilizing one or more machine learning mechanisms that utilize deep learning and further comprising associating at least a portion of the transcript with the one or more action items.

10. The computer-implemented method of claim 6, further comprising indexing at least a portion of data associated with the meeting record within a search index, wherein the search index is searchable by one or more search engines that are configured to provide one or more results in response to a query requesting information about the meeting.

11. The computer-implemented method of claim 6, further comprising causing a state of completion associated with the one or more action items to be tracked.

12. The computer-implemented method of claim 6, further comprising adding a meeting summarizer participant to the meeting, wherein the meeting summarizer participant causes the recording to be generated.

13. The computer-implemented method of claim 6, wherein causing the meeting record to be shared comprises providing for display of a graphical user interface (UI) that includes UI elements that are associated with the meeting record, wherein in response to a selection of a UI element of the UI elements associated with an action item of the one or more action items, a portion of the transcript is displayed within the graphical UI.

14. The computer-implemented method of claim 6, further comprising identifying at least one of speakers of the meeting or intended recipients of the speakers based at least in part on one or more of a video signal obtained during the meeting and the recording.

15. A system, comprising:
one or more processors provided by a service provider network; and
a non-transitory computer-readable storage medium having instructions stored thereupon which, when executed by the one or more processors, cause the system to perform actions, comprising:
accessing a recording of a meeting between participants;
generating, from the recording, a transcript of the meeting;
identifying one or more action items from the transcript, wherein an action item identifies an action for one or more of the participants to complete after the meeting;
generating a meeting record from the transcript, wherein the meeting record includes at least a portion of the transcript related to the one or more action items; and
causing at least a portion of the meeting record to be accessible via one or more devices of one or more of the participants.

16. The system of claim 15, wherein the actions further comprise receiving a request to attend the meeting, and in response to the request, cause a meeting summarizer participant associated with a meeting summary service to join the meeting at a specified time and cause the recording to be generated.

17. The system of claim 15, wherein identifying the one or more action items comprises:
identifying the one or more action items by one or more of parsing the transcript to identify one or more action words or receiving an output of one or more machine learning mechanisms that processes the transcript; and
assigning at least one of the one or more action items to one or more of the participants.

18. The system of claim 17, wherein the actions further comprise tracking a state of completion of the at least one of the one or more action items.

19. The system of claim 15, wherein the actions further comprise indexing at least a portion of data associated with the meeting record within a search index, wherein the search index is searchable by one or more search engines that are configured to provide one or more results in response to a query requesting information about the meeting.

20. The system of claim 15, wherein causing the meeting record to be shared comprises providing for display a graphical user interface (UI) that includes UI elements that are associated with the meeting record, wherein in response to a selection of a UI element of the UI elements associated with an action item of the one or more action items, a portion of one or more of the transcript and the recording is presented within the GUI.

* * * * *